US012652698B2

(12) United States Patent
Chung et al.

(10) Patent No.: US 12,652,698 B2
(45) Date of Patent: Jun. 9, 2026

(54) CHANNEL SELECTING METHOD FOR WIRELESS COMMUNICATION NETWORK AND SYSTEM THEREOF

(71) Applicant: Wistron NeWeb Corporation, Hsinchu (TW)

(72) Inventors: Chih-Wei Chung, Hsinchu (TW); Chia-Yi Lien, Hsinchu (TW); Yi-Ju Yang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 339 days.

(21) Appl. No.: 18/596,749

(22) Filed: Mar. 6, 2024

(65) Prior Publication Data

US 2025/0048424 A1     Feb. 6, 2025

(30) Foreign Application Priority Data

Aug. 2, 2023    (TW) ................................. 112129003

(51) Int. Cl.
    *H04W 4/00*        (2018.01)
    *H04W 48/16*       (2009.01)
    *H04W 74/0808*     (2024.01)

(52) U.S. Cl.
    CPC ....... *H04W 74/0808* (2013.01); *H04W 48/16* (2013.01)

(58) Field of Classification Search
    CPC ............. H04W 74/0808; H04W 48/16; H04W 72/0446; H04W 40/244; H04W 72/02;
    (Continued)

(56) References Cited

U.S. PATENT DOCUMENTS 5,449,490 A *   9/1995   Kondo ................. C22C 19/056
                                                       420/443
11,223,962 B2 *  1/2022   Pandey ................. H04W 16/26
                          (Continued)

FOREIGN PATENT DOCUMENTS

CN          104349480 A       2/2015
CN          106060946 A      10/2016
CN          108200655 A       6/2018

*Primary Examiner* — Marceau Milord
(74) *Attorney, Agent, or Firm* — McClure, Qualey & Rodack, LLP

(57)               ABSTRACT

A channel selecting method includes configuring a main access point to provide a first coverage area in a wireless communication network and performing a channel scanning on a plurality of communication channels to obtain a first area information; assigning an initial preference score to each of the communication channels and adjusting the initial preference score to a first preference score according to the first area information; transmitting a beacon request message to a communication device located in the first coverage area and having a second coverage area; controlling the communication device to perform another channel scanning on the communication channels to obtain a second area information; adjusting the first preference score of each of the communication channels to a second preference score according to the second area information; selecting the communication channel corresponding to the second preference score with a maximum value as a target channel.

20 Claims, 6 Drawing Sheets

10

(58) Field of Classification Search
CPC ............... H04W 72/085; H04W 48/20; H04W 72/0453; H04W 72/04
USPC ...................................... 455/450, 452.1, 515
See application file for complete search history.

(56) References Cited

U.S. PATENT DOCUMENTS

| | | | |
|---|---|---|---|
| 11,388,727 B1 * | 7/2022 | Argenti ................. | H04W 40/02 |
| 12,069,731 B2 * | 8/2024 | Hu ..................... | H04B 7/06958 |
| 2006/0142017 A1 * | 6/2006 | Suzuki ................. | H04W 48/16 |
| | | | 455/450 |
| 2012/0052900 A1 * | 3/2012 | Liu ................... | H04W 28/0205 |
| | | | 455/515 |
| 2012/0088536 A1 * | 4/2012 | Hwang ............. | H04W 74/0816 |
| | | | 455/515 |
| 2021/0051486 A1 * | 2/2021 | Pandey ................. | H04L 1/0026 |
| 2022/0078848 A1 * | 3/2022 | Hu ......................... | H04L 5/0048 |
| 2023/0239911 A1 * | 7/2023 | Yang .................... | H04W 48/16 |
| | | | 370/329 |
| 2023/0413175 A1 * | 12/2023 | Guo ..................... | H04L 5/0091 |
| 2024/0185304 A1 * | 6/2024 | Chalasani .......... | G06Q 30/0243 |
| 2025/0350999 A1 * | 11/2025 | Zhang .............. | H04W 28/0289 |

* cited by examiner

10

CHANNEL SELECTING METHOD FOR WIRELESS COMMUNICATION NETWORK AND SYSTEM THEREOF

RELATED APPLICATIONS

This application claims priority to Taiwan Application Serial Number 112129003, filed Aug. 2, 2023, which is herein incorporated by reference.

BACKGROUND

Technical Field

The present disclosure relates to a wireless communication method and a wireless communication system thereof. More particularly, the present disclosure relates to a channel selecting method for a wireless communication network and a channel selecting system thereof.

Description of Related Art

Wireless communication network (Wi-Fi) has become a wireless communication technology frequently used by modern men. The environment of the wireless communication network usually includes a plurality of access points (APs) and a plurality of clients. Each of the access point can include a plurality of virtual access points (VAPs), and the virtual access point use a front-haul interface to provide the client access to the Internet.

The access point can directly designate one of a plurality of channels as an operation channel, or select the operation channel through an automatic channel selecting mode. However, the automatic channel selecting mode in the prior art only considers the channel usage between the access points to determine the channels that can be used by the virtual access point, but does not take into account the surrounding environment of the client. For example, virtual access point 1 is a virtual access point belonging to home A, and the client is also a user of home A, while virtual access point 2 is a virtual access point belonging to home B. When the client is far away from virtual access point 1 and adjacent to virtual access point 2, if both virtual access points use channel 36, a packet transmitted by virtual access point 1 to the client will be interfered by virtual access point 2. It can be seen that there is currently a lack of an optimal channel selecting method and a system thereof on the market that can consider the surrounding environment of the access point and the surrounding environment of the client at the same time. Therefore, relevant industries are seeking solutions to address this issue.

SUMMARY

According to one aspect of the present disclosure, a channel selecting method for a wireless communication network includes performing a first area information obtaining step, a first adjusting step, a beacon request transmitting step, a second area information obtaining step, a second adjusting step and a channel selecting step. The first area information obtaining step includes configuring a main access point to provide a first coverage area in the wireless communication network and perform a channel scanning on a plurality of communication channels to obtain a first area information corresponding to the first coverage area. The first adjusting step includes configuring the main access point to assign an initial preference score to each of the communication channels and adjust the initial preference score of each of the communication channels to a first preference score according to the first area information. The beacon request transmitting step includes configuring the main access point to transmit a beacon request message to a communication device located in the first coverage area. The communication device has a second coverage area in the wireless communication network. The second area information obtaining step includes configuring the main access point to control the communication device through the beacon request message to perform another channel scanning on the communication channels to obtain a second area information corresponding to the second coverage area from the communication device. The second adjusting step includes configuring the main access point to adjust the first preference score of each of the communication channels to a second preference score according to the second area information. The channel selecting step includes configuring the main access point to select one of the communication channels corresponding to the second preference score with a maximum value as a target channel and utilize the target channel to communicate with the communication device.

According to another aspect of the present disclosure, a channel selecting system for a wireless communication network includes a main access point and a communication device. The main access point provides a first coverage area in the wireless communication network. The communication device is signally connected to the main access point. The communication device is located in the first coverage area and has a second coverage area in the wireless communication network. The main access point is configured to implement a channel selecting method for the wireless communication network including performing a first area information obtaining step, a first adjusting step, a beacon request transmitting step, a second area information obtaining step, a second adjusting step and a channel selecting step. The first area information obtaining step includes configuring the main access point to perform a channel scanning on a plurality of communication channels to obtain a first area information corresponding to the first coverage area. The first adjusting step includes configuring the main access point to assign an initial preference score to each of the communication channels and adjust the initial preference score of each of the communication channels to a first preference score according to the first area information. The beacon request transmitting step includes configuring the main access point to transmit a beacon request message to the communication device. The second area information obtaining step includes configuring the main access point to control the communication device through the beacon request message to perform another channel scanning on the communication channels to obtain a second area information corresponding to the second coverage area from the communication device. The second adjusting step includes configuring the main access point to adjust the first preference score of each of the communication channels to a second preference score according to the second area information. The channel selecting step includes configuring the main access point to select one of the communication channels corresponding to the second preference score with a maximum value as a target channel and utilize the target channel to communicate with the communication device.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected" to another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
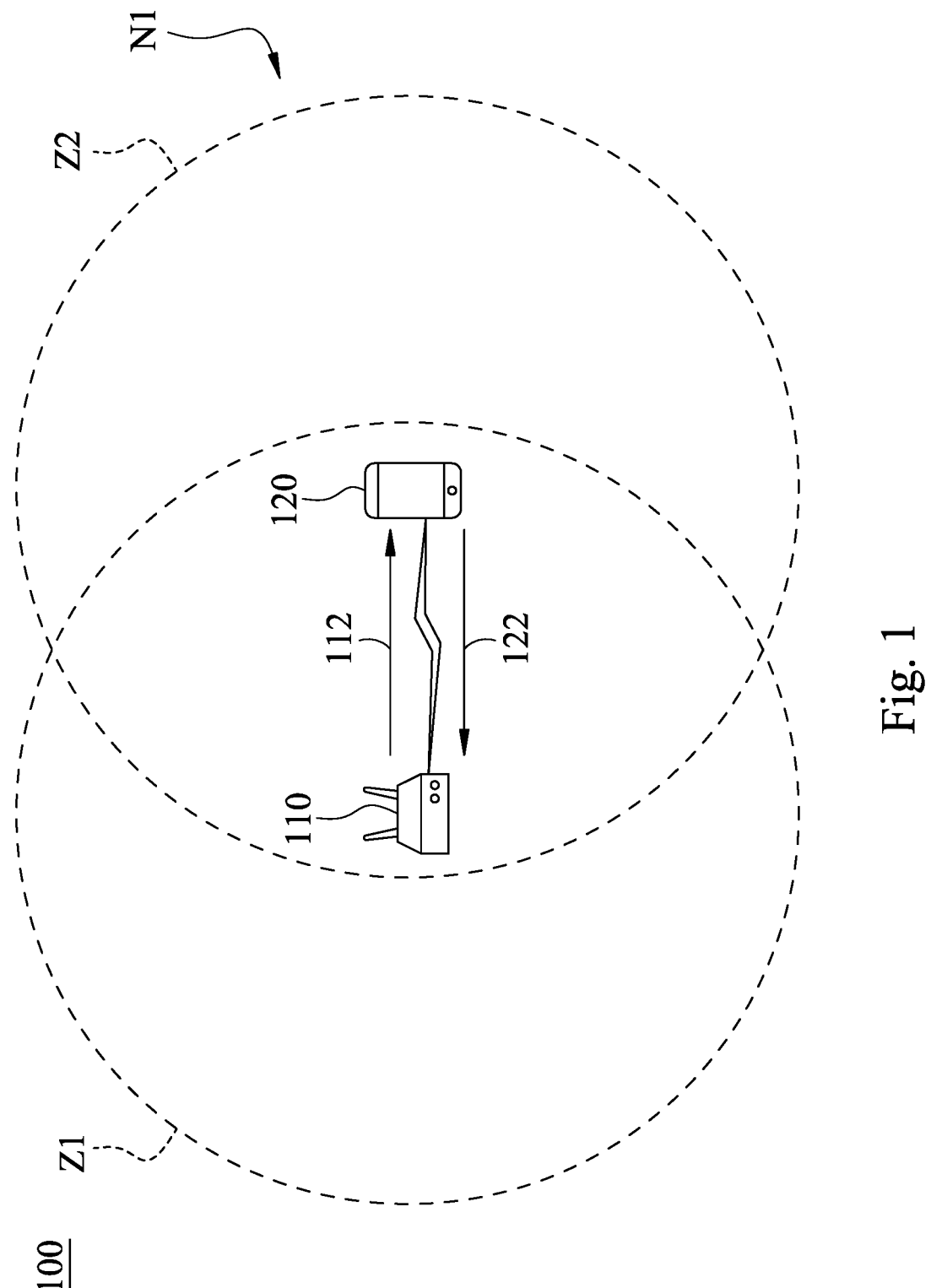
FIG. 1 shows a schematic view of a channel selecting system for a wireless communication network according to a first embodiment of the present disclosure.

Please refer to FIG. 1. FIG. 1 shows a schematic view of a channel selecting system 100 for a wireless communication network (hereinafter referred to as "the channel selecting system 100") according to a first embodiment of the present disclosure. In FIG. 1, the channel selecting system 100 operates on a wireless communication network N1. The wireless communication network N1 can be wireless local area network (WLAN), such as an example of a Wi-Fi network. For example, the wireless communication network N1 can be a 5G Wi-Fi network that implements the IEEE 802.11 series of wireless communication protocols. The 5G Wi-Fi network can include a plurality of communication channels. According to the following FIG. 5, it can be seen that the communication channels can be a channel 36, a channel 40, a channel 44, a channel 48, a channel 52, a channel 56, a channel 60, a channel 64, a channel 100, a channel 104, a channel 108, a channel 112, a channel 116, a channel 120, a channel 124, a channel 128, a channel 132, a channel 136, a channel 140, a channel 144, a channel 149, a channel 153, a channel 157, a channel 161 and a channel 165, but the present disclosure is not limited thereto.

The channel selecting system 100 includes a main access point 110 and a communication device 120. The main access point 110 provides a first coverage area Z1 in the wireless communication network N1. The communication device 120 has a second coverage area Z2 in the wireless communication network N1. The first coverage area Z1 and the second coverage area Z2 can respectively be a basic service area (BSA) of the main access point 110 and the communication device 120, and overlap each other. The communication device 120 is located in the first coverage area Z1, and signally connected to the main access point 110. The main access point 110 operates on a main operation channel (e.g., the channel 36) and transmits messages with the communication device 120 through the main operation channel. The main access point 110 is configured to implement a channel selecting method for the wireless communication network N1 including performing a first area information obtaining step, a first adjusting step, a beacon request transmitting step, a second area information obtaining step, a second adjusting step and a channel selecting step.

Through the aforementioned steps, the main access point 110 assigns an initial preference score to each of the communication channels, and then performs a channel scanning on the communication channels to obtain a first area information corresponding to the surrounding environment (i.e., the first coverage area Z1) of the main access point 110, and adjusts the initial preference score of each of the communication channels to a first preference score according to the first area information. The main access point 110 controls the communication device 120 through a beacon request message 112 to perform another channel scanning on the communication channels to obtain a second area information corresponding to the surrounding environment (i.e., the second coverage area Z2) of the communication device 120. The communication device 120 returns a beacon report message 122 carrying the second area information to the main access point 110. The beacon request message 112 can include a beacon request frame based on the IEEE 802.11 standard, which is configured to carry a vendor specific information. The beacon report message 122 can include a beacon report frame based on the IEEE 802.11 standard, which is configured to carry another vendor specific information. Thus, the main access point 110 communicates with the communication device 120 by using the beacon request message 112, and the communication device 120 communicates with the main access point 110 by using the beacon report message 122.

The main access point 110 adjusts the first preference score of each of the communication channels to a second preference score according to the second area information, and then selects one of the communication channels corresponding to the second preference score with a maximum value as a target channel and utilize the target channel to communicate with the communication device 120. In addition, the aforementioned beacon request frame can carry a channel switch announcement (CSA). In response to determining that the target channel is different from the main operation channel, the main access point 110 sends the channel switch announcement to the communication device 120, causing the main access point 110 and the communication device 120 to switch from the main operation channel to the target channel. In response to determining that the target channel is the same as the main operation channel, the main access point 110 maintains utilizing the main operation channel to communicate with the communication device 120. Therefore, the main access point 110 of the present disclosure uses the first area information and the second area information to adjust the preference scores assigned to each of the communication channels in stages, and selects the communication channel with a higher score as the target channel, so that the communication between the main access point 110 and the communication device 120 can avoid the interference caused by other access points covered by the first coverage area Z1 and the second coverage area Z2 to the main access point 110 and the communication device 120. The steps of channel selecting method of the present disclosure are described in more detail with the drawings and the embodiments below.

Figure 2:
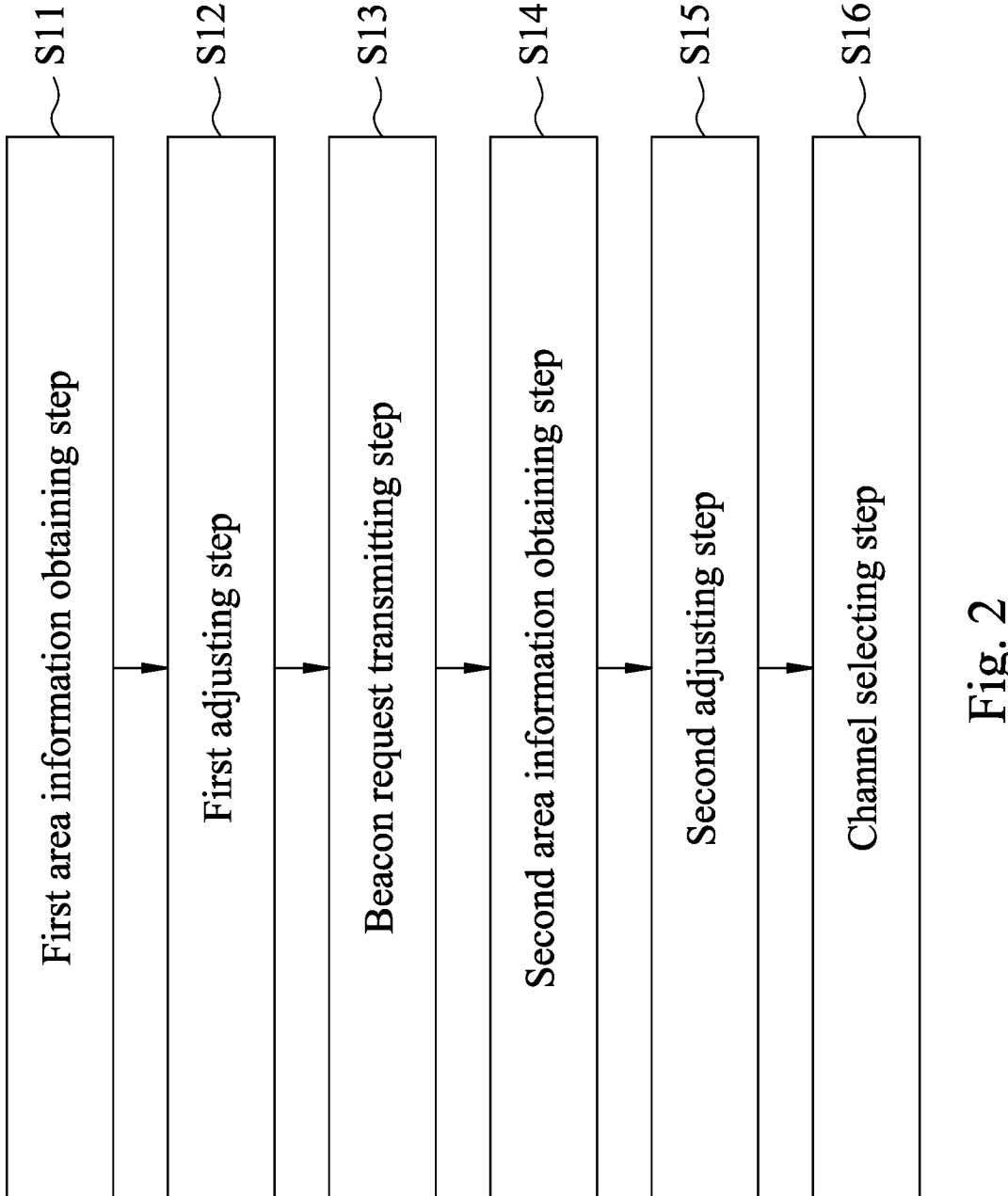
FIG. 2 shows a flow chart of a channel selecting method for the wireless communication network according to a second embodiment of the present disclosure.
Figure 3:
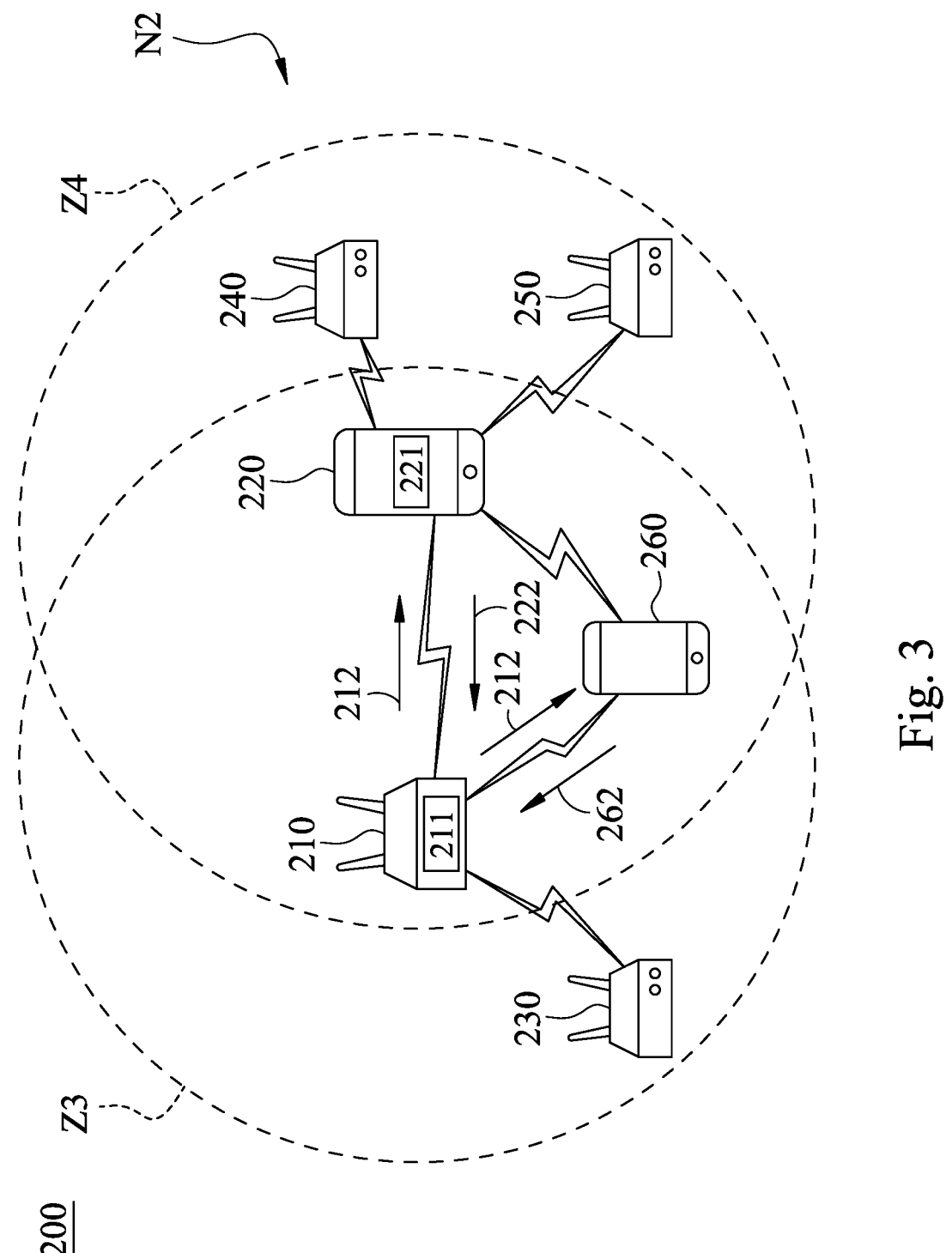
FIG. 3 shows a schematic view of the channel selecting method for the wireless communication network applied to the channel selecting system for the wireless communication network of FIG. 2.

Please refer to FIGS. 2 and 3. FIG. 2 shows a flow chart of a channel selecting method 10 for a wireless communication network (hereinafter referred to as "the channel selecting method 10") according to a second embodiment of the present disclosure. FIG. 3 shows a schematic view of the channel selecting method 10 applied to a channel selecting system 200 for a wireless communication network (hereinafter referred to as "the channel selecting system 200") of FIG. 2. In FIGS. 2 and 3, the channel selecting method 10 includes performing a first area information obtaining step S11, a first adjusting step S12, a beacon request transmitting step S13, a second area information obtaining step S14, a second adjusting step S15 and a channel selecting step S16. The channel selecting method 10 is configured to provide the channel selecting system 200 to select a target channel in a wireless communication network N2 and use it as the best channel for communication between a main access point 210 and a communication device 220.

It should be noted that the wireless communication network N2 is the same as the wireless communication network N1 in FIG. 1, and both are 5G Wi-Fi networks and include the communication channels. The channel selecting system 200 can include a main access point 210, a communication device 220, a first access point 230, a second access point 240, a third access point 250 and a main communication device 260. A first coverage area Z3 provided by the main access point 210 covers the communication device 220, the first access point 230 and the main communication device 260; in other words, all of the communication device 220, the first access point 230 and the main communication device 260 can be signally connected to the main access point 210. The communication device 220 has a second coverage area Z4, and the second coverage area Z4 covers the main access point 210, the second access point 240, the third access point 250 and the main communication device 260; in other words, the communication device 220 can receive the signals of the main access point 210, the second access point 240, the third access point 250 and the main communication device 260. Only some communication channels (such as a channel 36, a channel 40, a channel 44, a channel 48, a channel 52, a channel 56, a channel 60, a channel 64, a channel 100 and a channel 104) are listed below as examples of the channel selecting method 10. In addition, the main access point 210 operates on a main operation channel (e.g., the channel 36) based on an automatic channel selecting mode, and transmits messages with the communication device 220 through the main operation channel before executing the channel selection method 10.

Please to refer to Table 1. Table 1 lists a score setting rule of the channel selecting method 10 of the present disclosure. The main access point 210 sets a plurality of preference scores of the operation channels of other access points to 5 according to the score setting rule, sets a preference score of a group channel that belongs to the same usage bandwidth interval the same as the operation channels of the other access points to 10, and sets a preference score of a busy channel to 1.

TABLE 1

|  | Access point | Communication device | Main communication device |
| --- | --- | --- | --- |
| Group channel | 10 | 10 | 5 |
| Operation channel | 5 | 5 | 3 |
| Busy channel | 1 | 1 | 1 |

The first area information obtaining step S11 includes configuring the main access point 210 to provide the first coverage area Z3 in the wireless communication network N2 and perform a channel scanning on a plurality of communication channels to obtain a first area information 211 corresponding to the first coverage area Z3. The first adjusting step S12 includes configuring the main access point 210 to assign an initial preference score (such as 15, shown in the score field of Table 2 below) to each of the communication channels, and adjust the initial preference score of each of the communication channels to a first preference score (shown in the score field of Table 3 below) according to the first area information 211 and the score setting rule.

TABLE 2

| Channel | 36 | 40 | 44 | 48 | 52 | 56 | 60 | 64 | 100 | 104 |
| --- | --- | --- | --- | --- | --- | --- | --- | --- | --- | --- |
| Score | 15 | 15 | 15 | 15 | 15 | 15 | 15 | 15 | 15 | 15 |

TABLE 3

| Channel | 36 | 40 | 44 | 48 | 52 | 56 | 60 | 64 | 100 | 104 |
| --- | --- | --- | --- | --- | --- | --- | --- | --- | --- | --- |
| Score | 15 | 15 | 15 | 15 | 15 | 15 | 10 | 5 | 15 | 15 |

In detail, in the first adjusting step S12, the main access point 210 start by determining a plurality of signal strengths of other access points covered by the first coverage area Z3 (i.e., the first access point 230) according to the first area information 211, and then determining a plurality of channel utilization rates of the communication channels. The first area information 211 can include the channel utilization rates of the communication channels, an operation channel (e.g., the channel 64), an operation class and a channel power value of the first access point 230. The operation class of the first access point 230 can be an operation class specified by IEEE 802.11ac standard, and the channel power value can be a value of a received channel power indicator (RCPI).

Figure 4:
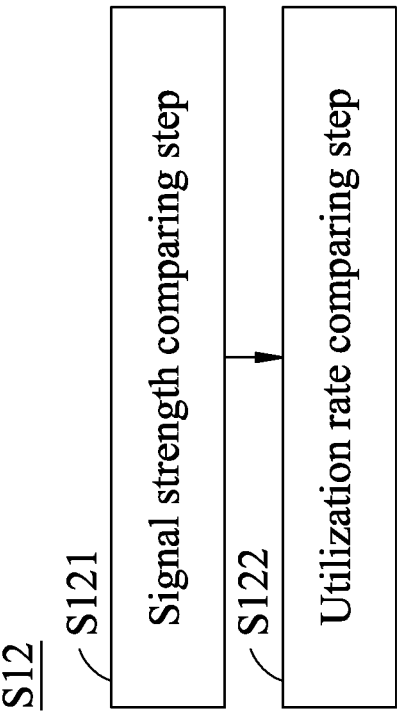
FIG. 4 shows a flow chart of a first adjusting step of the channel selecting method for the wireless communication network of FIG. 2.
Figure 5:
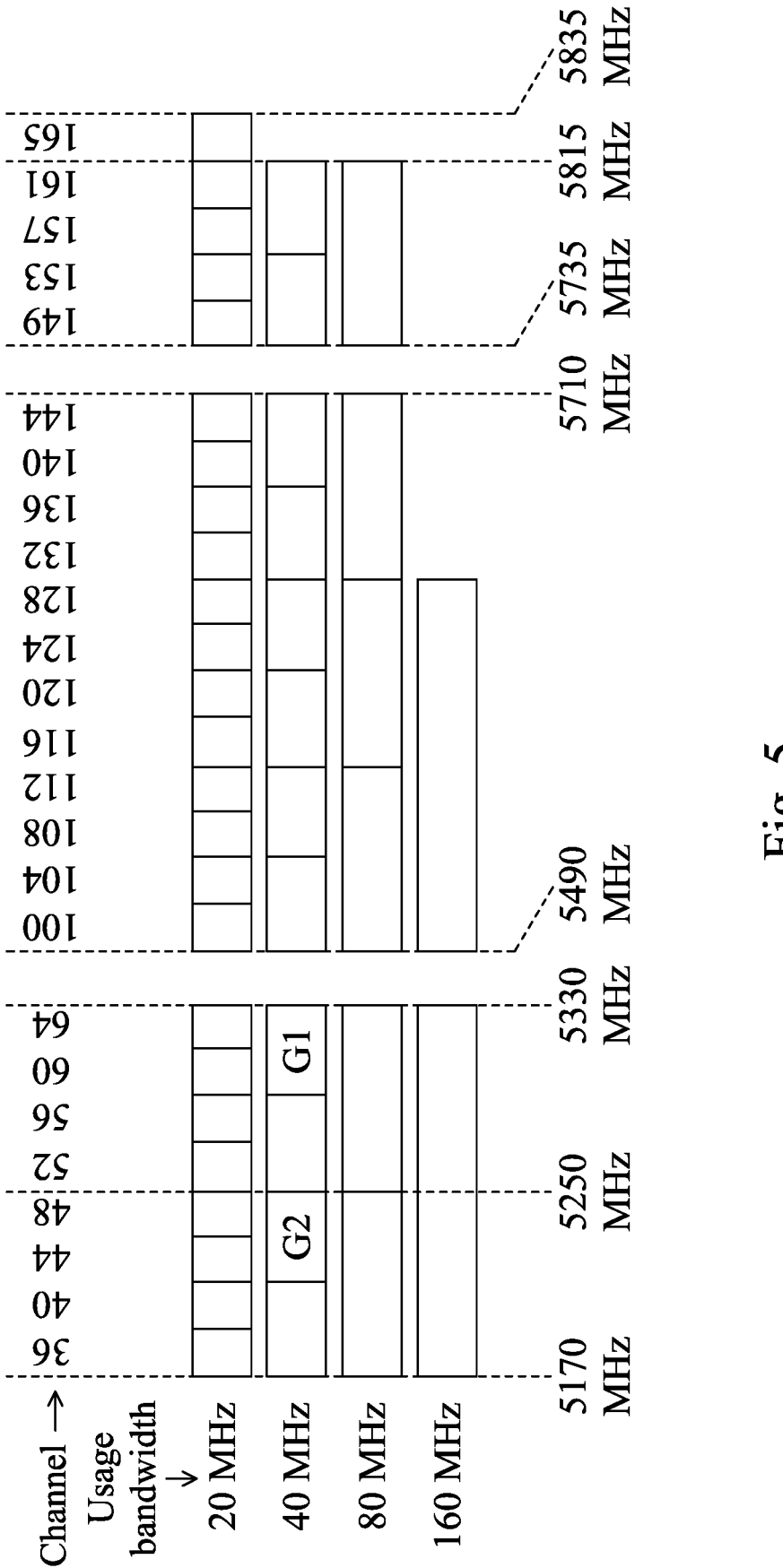
FIG. 5 shows a schematic view of a channel allocation of a wireless network standard of the present disclosure.

Please to refer to FIGS. 4 and 5. FIG. 4 shows a flow chart of the first adjusting step S12 of the channel selecting method 10 of FIG. 2. FIG. 5 shows a schematic view of a channel allocation of a wireless network standard of the present disclosure. In FIG. 4, the first adjusting step S12 can further include performing a signal strength comparing step S121 and a utilization rate comparing step S122.

The signal strength comparing step S121 is performed to configure the main access point 210 to convert the channel power value of the first access point 230 into a signal strength value, and compare the signal strength value with a signal strength threshold stored in a memory inside the main access point 210. The signal strength threshold can be −70 dBm.

In response to determining that the signal strength value corresponding to the first access point 230 is greater than or equal to the signal strength threshold, the main access point 210 adjusts the initial preference score corresponding to the operation channel (the channel 64) of the first access point 230 to a first score (e.g., 5), searches for at least another one of the communication channels that belongs to a usage bandwidth interval the same as the operation channel according to the operation class of the first access point 230, and adjusts the initial preference score of the at least another one of the communication channels to a second score (e.g., 10). The second score is greater than the first score. In response to determining that the signal strength value corresponding to the first access point 230 is less than the signal strength threshold, the main access point 210 determines that the operation channel of the first access point 230 and the communication channels belonging to the same usage bandwidth interval are not enough to affect the communication between the main access point 210 and the communication device 220, so that the main access point 210 do not adjust the initial preference scores of the operation channel (the channel 64) and the communication channels belonging to the same usage bandwidth interval.

In this embodiment, the signal strength value corresponding to the first access point 230 is −70 dBm, so it is equal to the signal strength threshold. Therefore, the main access point 210 adjusts the initial preference score of the channel 64 to the first score according to the score setting rule (i.e., adjusting the initial preference score of the channel 64 from 15 in Table 2 to 5 in Table 3).

In detail, the wireless network standard used in the channel allocation of FIG. 5 can be the IEEE 802.11ac standard. The main access point 210 learns from the specification of the IEEE 802.11ac standard that a usage bandwidth of the operation channel (the channel 64) of the first access point 230 is HT40 (i.e., 40 MHZ) according to a class number of the operation class of the first access point 230. Since the channel 60 and the channel 64 belong to a usage bandwidth interval G1 under the condition that the usage bandwidth is 40 MHZ, the main access point 210 adjusts the initial preference score of the channel 60 to the second score (i.e., the initial preference score of the channel 60 is adjusted from 15 in Table 2 to 10 in Table 3). In Table 3, the first preference scores of the rest of the communication channels other than the channel 60 and the channel 64 are the same as the initial preference scores.

In the first area information 211, the channel utilization rates can include a plurality of main channel utilization rates and a plurality of external channel utilization rates. The main channel utilization rate is a utilization rate of any operation channel used by the main access point 210 in the channel utilization rates obtained by performing the channel scanning on all of the operation channels. The external channel utilization rate is a utilization rate of any operation channel resulting from a factor other than the usage of the main access point 210 in the channel utilization rates obtained by performing the channel scanning on all of the operation channels, and the external channel utilization rate can be caused by the environment. For example, if the channel utilization rate of the channel 36 is 70% and the main access point 210 operates on the channel 36 (the main channel utilization rate is, for example, 20%), then the external channel utilization rate of the channel 36 is 50%. At this moment, a main channel utilization rate of other channel (such as a channel X) except the channel 36 is 0%. If the main access point 210 scans and obtains a channel utilization rate of the channel X as 40%, then the 40% is the external channel utilization rate. The utilization rate comparing step S122 is performed to configure the main access point 210 to compare the external channel utilization rates in the first area information 211 with a channel utilization rate threshold (e.g., 70%) stored in the memory inside the main access point 210. In response to determining that one of the external channel utilization rates is greater than or equal to the channel utilization rate threshold, the main access point 210 determines that one of the communication channels corresponding to the one of the external channel utilization rates is a busy channel, and adjust the initial preference score, the first score or the second score corresponding to the busy channel to a third score (such as 1, shown in the score field of Table 4 below). The third score is less than the first score.

TABLE 4

| Channel | 36 | 40 | 44 | 48 | 52 | 56 | 60 | 64 | 100 | 104 |
|---|---|---|---|---|---|---|---|---|---|---|
| Score | 15 | 15 | 15 | 1 | 15 | 15 | 1 | 5 | 15 | 1 |

For example, the main access point 210 finds out that the external channel utilization rates of the channel 48, the channel 60, and the channel 104 are respectively 70%, 75%, and 80% after performing the channel scanning. Since the external channel utilization rates of the three channels are greater than/equal to the channel utilization rate threshold (70%), the main access point 210 determines that the channel 48, the channel 60 and the channel 104 are the busy channels. The main access point 210 adjusts the initial preference scores of the channel 48 and the channel 104 to the third score (i.e., from 15 in Table 3 to 1 in Table 4), and adjusts the second score of the channel 60 to the third score (i.e., from 10 in Table 3 to 1 in Table 4). In this embodiment, the initial preference score, the first score, the second score and the third score are 15, 5, 10 and 1, respectively. The way the main access point 210 adjusts the preference score is based on a rule that small values overwrite large values. In other embodiments, if the main access point 210 determines that the channel 60 is a busy channel, the main access point 210 adjusts the first score of the channel 60 to the third score based on the rule that small values overwrite large values. It can be known from the first area information obtaining step S11 and the first adjusting step S12 that the main access point 210 has adjusted the preference score of each of the communication channels based on its surrounding environment (i.e., the first coverage area Z3). The following will continue to describe how the main access point 210 adjusts the preference scores of each communication channel based on the surrounding environment of the communication device 220 (i.e., the second coverage area Z4).

The beacon request transmitting step S13 includes configuring the main access point 210 to transmit a beacon request message 212 to the communication device 220 located in the first coverage area Z3. The communication device 220 has the second coverage area Z4 in the wireless communication network N2. The second area information obtaining step S14 includes configuring the main access point 210 to control the communication device 220 through the beacon request message 212 to perform another channel scanning on the communication channels so as to obtain a second area information 221 corresponding to the second coverage area Z4 from the communication device via a beacon report message 222. Specifically, the main access point 210 makes a designated channel list according to the communication channels other than the busy channel determined by itself, and the designated channel list can be carried by the beacon request message 212. In other words, the designated channel list shows the rest of the channels except the channel 48, the channel 60 and the channel 104.

In the second area information obtaining step S14, the communication device 220 only needs to perform the another channel scanning on the channel 36, the channel 40, the channel 44, the channel 52, the channel 56, the channel 64 and the channel 100 according to the beacon request message 212, thereby reducing the burden of the communication device 220.

Figure 6:
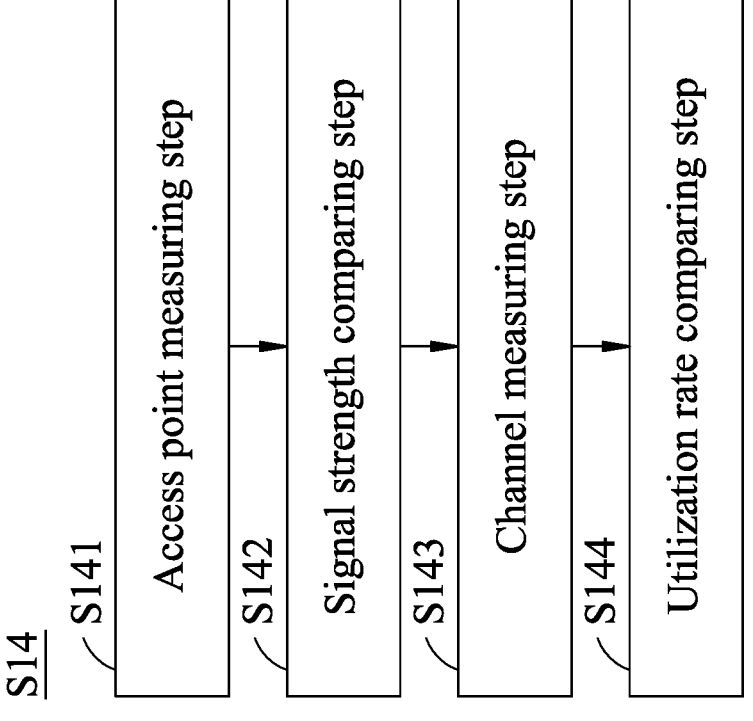
FIG. 6 shows a flow chart of a second area information obtaining step of the channel selecting method for the wireless communication network of FIG. 2.

Please refer to FIG. 6. FIG. 6 shows a flow chart of the second area information obtaining step S14 of the channel selecting method 10 of FIG. 2. In detail, the beacon request message 212 can include the designated channel list, the signal strength threshold (−70 dBm) and the channel utilization rate threshold (70%). In FIG. 6, the second area information obtaining step S14 can further include performing an access point measuring step S141 and a signal strength comparing step S142.

The access point measuring step S141 is performed to configure the main access point 210 to control the communication device 220 through the beacon request message 212 to measure a plurality of operation channels, a plurality of operation classes and a plurality of channel power values of other access points (i.e., the second access point 240 and the third access point 250) covered by the second coverage area Z4 through the beacon request message 212, and convert the channel power values of the second access point 240 and the third access point 250 into two signal strength values. The signal strength comparing step S142 is performed to configure the main access point 210 to control the communication device 220 through the beacon request message 212 to compare the signal strength values of the second access point 240 and the third access point 250 with the signal strength threshold (−70 dBm).

In this embodiment, the second access point 240 is closer to the communication device 220, and the signal strength value corresponding to the second access point 240 is −60 dBm and greater than the signal strength threshold (−70 dBm), so that the communication device 220 integrates the operation channel, the operation class and the channel power values of the second access point 240 into the second area information 221. The third access point 250 is far away from the communication device 220, and the signal strength value corresponding to the third access point 250 is −85 dBm and less than the signal strength threshold (−70 dBm). Therefore, the communication device 220 determines that the operation channel of the third access point 250 is not enough to affect the communication between the main access point 210 and the communication device 220, so the second area information 221 does not carry any information about the third access point 250.

The second adjusting step S15 includes configuring the main access point 210 to adjust the first preference score of each of the communication channels to a second preference score (shown in the score field of Table 5 below) according to the second area information carried by the beacon report message 222.

TABLE 5

| Channel | 36 | 40 | 44 | 48 | 52 | 56 | 60 | 64 | 100 | 104 |
|---------|----|----|----|----|----|----|----|----|-----|-----|
| Score   | 15 | 15 | 5  | 1  | 15 | 15 | 1  | 5  | 15  | 1   |

In detail, the second adjusting step S15 can further include performing a score assigning step, which is performed to configure the main access point 210 to assign a first score (e.g., 5) to the operation channel corresponding to the second access point 240, search for at least another one of the communication channels that belongs to a usage bandwidth interval the same as the operation channel of the second access point 240 according to the operation class of the second access point 240, and assign a second score (e.g., 10) to the at least another one of the communication channels. The second score is greater than the first score.

In response to determining that the first score to be allocated is less than the current first preference score, the main access point 210 adjusts the first preference score of the one of the communication channels corresponding to the operation channel of the second access point 240 to the first score. In response to determining that the first score to be allocated is greater than the current first preference score, the main access point 210 maintains the first preference score of the one of the communication channels corresponding to the operation channel of the second access point 240, and uses the first preference score as the second preference score. Further, in response to determining that the second score to be allocated is less than the current first preference score, the main access point 210 adjusts the first preference score corresponding to the at least another one of the communication channels to the second score. In response to determining that the second score to be allocated is greater than the current first preference score, the main access point 210 maintains the first preference score corresponding to the at least another one of the communication channels, and uses the first preference score as the second preference score.

According to the second area information 221, the main access point 210 knows that the communication device 220 has determined that the operation channel of the second access point 240 is sufficient to affect the communication between the main access point 210 and the communication device 220, and the operation channel of the second access point 240 can be the channel 44. The first score (5) to be allocated is smaller than the first preference score (15, shown in Table 4) of the channel 44, so the main access point 210 adjusts the first preference score corresponding to the channel 44 to the first score (i.e., from 15 in Table 4 to 5 in Table 5) based on the rule that small values overwrite large values. In addition, the main access point 210 learns from the specification of the IEEE 802.11ac standard that a usage bandwidth of the operation channel (the channel 44) of the second access point 240 is HT40 (i.e., 40 MHZ) according to a class number of the operation class of the second access point 240. The channel 48 and the channel 44 belong to a usage bandwidth interval G2 under the condition that the usage bandwidth is 40 MHz. The second score (10) to be allocated to the channel 48 is greater than the first preference score (1, shown in Table 4) of the channel 48. Based on the rule that small values overwrite large values, the main access point 210 maintains the first preference score (1) corresponding to the channel 48 and uses the first preference score as the second preference score (shown in Table 5).

In FIG. 6, the second area information obtaining step S14 can further include performing a channel measuring step S143 and a utilization rate comparing step S144. The channel measuring step S143 is performed to configure the main access point 210 to control the communication device 220 through the beacon request message 212 to measure a plurality of channel utilization rates of a part of the communication channels (i.e., the channel 36, the channel 40, the channel 44, the channel 52, the channel 56, the channel 64, the channel 100) according to the designated channel list. The utilization rate comparing step S144 is performed to configure the main access point 210 to control the communication device 220 through the beacon request message 212 to compare the channel utilization rates with the channel utilization rate threshold (70%). In response to determining that one of the channel utilization rates is greater than or equal to the channel utilization rate threshold (70%), the communication device 220 determines that one of the communication channels corresponding to the one of the channel utilization rates is a busy channel, and integrates a channel information of the busy channel into the second area information 221. In response to determining that the busy channel is different from the main operation channel (the channel 36) of the main access point 210, the main access point 210 adjusts the first preference score corresponding to the busy channel to a third score (e.g., 1, shown in the score field in Table 6 below), and the third score is less than the first score.

TABLE 6

| Channel | 36 | 40 | 44 | 48 | 52 | 56 | 60 | 64 | 100 | 104 |
|---------|----|----|----|----|----|----|----|----|-----|-----|
| Score | 15 | 15 | 5 | 1 | 1 | 1 | 1 | 5 | 15 | 1 |

For example, the main access point 210 finds out that the channel utilization rates of the channel 36, the channel 52, and the channel 56 are respectively 70%, 75%, and 80% after performing the channel scanning. Since the channel utilization rates of the three channels are greater than/equal to the channel utilization rate threshold (70%), the main access point 210 determines that the channel 36, the channel 52 and the channel 56 are the busy channels. Since the channel 52 and the channel 56 are not the main operation channel (the channel 36) of the main access point 210, the main access point 210 adjusts the first preference scores corresponding to the channel 52 and the channel 56 to the third score (that is, from 15 in Table 5 to 1 in Table 6). However, when the busy channel determined by the communication device 220 is the main operation channel of the main access point 210, the preference score of the main operation channel of the main access point 210 is adjusted according to the following three situations.

Situation 1 (the present embodiment): in response to determining that a main channel utilization rate of the channel 36 (that is, an utilization rate of the main access point 210 using the channel 36, e.g., 60%) is less than the channel utilization rate threshold (70%), the main access point 210 adjusts the first preference score of the channel 36 to the third score. Since the first preference score of channel 36 has not been adjusted, the first preference score of the channel 36 still maintains the same score as the initial preference score. The main access point 210 adjusts the initial preference score corresponding to the channel 36 to the third score (i.e., from 15 in Table 6 to 1 in the following Table 7).

TABLE 7

| Channel | 36 | 40 | 44 | 48 | 52 | 56 | 60 | 64 | 100 | 104 |
|---------|----|----|----|----|----|----|----|----|-----|-----|
| Score | 1 | 15 | 5 | 1 | 1 | 1 | 1 | 5 | 15 | 1 |

Situation 2 (other embodiment): in response to determining that the main operation channel (the channel 36) of the main access point 210 is different from the operation channel (the channel 44) of the second access point 240, and a main channel utilization rate of the main operation channel (that is, an utilization rate of the main access point 210 using the channel 36, e.g., 75%) is greater than or equal to the channel utilization rate threshold (70%), the main access point 210 maintains the initial preference score corresponding to the main operation channel (the channel 36), that is, the score of the channel 36 in Table 6 is unchanged.

Situation 3 (other embodiment): in response to determining that the main operation channel (the channel 36) of the main access point 210 is the same as the operation channel (assumed to be the channel 36) of the second access point 240, and a main channel utilization rate of the main operation channel (that is, an utilization rate of the main access point 210 using the channel 36, e.g., 80%) is greater than or equal to the channel utilization rate threshold (70%), the main access point 210 adjusts the initial preference score corresponding to the main operation channel to the third score (that is, from 15 in Table 6 to 1 in the following Table 8).

TABLE 8

| Channel | 36 | 40 | 44 | 48 | 52 | 56 | 60 | 64 | 100 | 104 |
|---------|----|----|----|----|----|----|----|----|-----|-----|
| Score | 1 | 15 | 5 | 1 | 1 | 1 | 1 | 5 | 15 | 1 |

It should be noted that the main purpose of situations 2, 3 is to prevent the main access point 210 from automatically excluding the main operation channel when selecting the best channel under the condition that the main operation channel is determined to be the busy channel (that is, the main channel utilization rate of the main operation channel is greater than or equal to the channel utilization rate threshold). The aforementioned signal strength threshold and channel utilization rate threshold are configured according to user's needs, so the present disclosure is not limited thereto.

The channel selecting step S16 includes configuring the main access point 210 to select one of the communication channels corresponding to the second preference score with a maximum value as a target channel, and utilize the target channel to communicate with the communication device 220. In Table 7, the channel 40 and the channel 100 have the second preference score with a maximum value (i.e., 15), so the main access point 210 can select either the channel 40 or the channel 100 as the target channel. In response to determining that the target channel is different from the main operation channel, the main access point 210 sends a channel switch announcement to the communication device 220, causing the main access point 210 and the communication device 220 to switch from the main operation channel to the target channel. In response to determining that the target channel is the same as the main operation channel, the main access point 210 maintains utilizing the main operation channel to communicate with the communication device 220. Therefore, the channel selecting method 10 of the present disclosure can numerically score and update the initial preference score of each of the communication channels according to the first area information 211 obtained performing the channel scanning of the main access point 210 and the second area information 221 carried in the beacon report message 222. Finally, the target channel with the highest value is selected as the best channel, and the channel switch announcement is sent to the communication device 220, so that the communication between the main access point 210 and the communication device 220 can avoid interference caused by other access points to the communication device 220.

On the other hand, the main access point 210 can set other communication devices corresponding to a media access control address (MAC) in the first coverage area Z3 as the main communication device 260. After the main communication device 260 receives the beacon request message 212, the main communication device 260 performs the same operation as the communication device 220 (that is, the above situation 3 and Table 8), and returns a beacon report message 262 to the main access point 210.

If the main access point 210 learns from an area information carried by the beacon report message 262 that a signal strength value of the operation channel (the channel 64) of the first access point 230 is greater than or equal to the signal strength threshold (−70 dBm), the main access point 210 determines that the signal strength of the first access point 230 is sufficient to affect the communication between the main access point 210 and the main communication device 260. The main access point 210 adjusts the preference scores of the channel 60 and the channel 64 from Table 8 to the following Table 9 according to an operation class of the first access point 230, the rule that small values overwrite large values and the score setting rule of Table 1.

TABLE 9

| Channel | 36 | 40 | 44 | 48 | 52 | 56 | 60 | 64 | 100 | 104 |
|---------|----|----|----|----|----|----|----|----|-----|-----|
| Score | 1 | 15 | 5 | 1 | 1 | 1 | 1 | 3 | 15 | 1 |

Therefore, the channel selecting method 10 of the present disclosure can also change the weight of the communication channel associated with the main communication device 260 by lowering the value of a group channel, an operation channel or a busy channel corresponding to the main communication device 260 in the score setting rule.

In view of the above, the present disclosure has the following advantages. First, obtaining the second area information of the surrounding environment of the communication device through the beacon report message, and use the first and second area information to adjust the preference score assigned to each of the communication channels, so that the communication between the main access point and the communication device can avoid the interference caused by access points around the main access point and the interference caused by access points around the communication device. Second, through the designated channel list carried by the beacon request message, the main access point can flexibly specify the data that the communication device needs to report, thereby reducing the burden of the communication device. Third, by lowering the value of the group channel, the operation channel or the busy channel corresponding to the main communication device in the score setting rules, the weight of the communication channel associated with the main communication device can be changed.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A channel selecting method for a wireless communication network, comprising:

performing a first area information obtaining step comprising configuring a main access point to provide a first coverage area in the wireless communication network and perform a channel scanning on a plurality of communication channels to obtain a first area information corresponding to the first coverage area;

performing a first adjusting step comprising configuring the main access point to assign an initial preference score to each of the communication channels and adjust the initial preference score of each of the communication channels to a first preference score according to the first area information;

performing a beacon request transmitting step comprising configuring the main access point to transmit a beacon request message to a communication device located in the first coverage area, wherein the communication device has a second coverage area in the wireless communication network;

performing a second area information obtaining step comprising configuring the main access point to control the communication device through the beacon request message to perform another channel scanning on the communication channels to obtain a second area information corresponding to the second coverage area from the communication device;

performing a second adjusting step comprising configuring the main access point to adjust the first preference score of each of the communication channels to a second preference score according to the second area information; and performing a channel selecting step comprising configuring the main access point to select one of the communication channels corresponding to the second preference score with a maximum value as a target channel and utilize the target channel to communicate with the communication device.

2. The channel selecting method for the wireless communication network of claim 1, wherein the first coverage area covers a first access point, the first area information comprises an operation channel, an operation class and a channel power value of the first access point, and the first adjusting step further comprises:

performing a signal strength comparing step to configure the main access point to convert the channel power value into a signal strength value and compare the signal strength value with a signal strength threshold;

wherein in response to determining that the signal strength value corresponding to the first access point is greater than or equal to the signal strength threshold, the main access point adjusts the initial preference score corresponding to the operation channel of one of the communication channels to a first score, searches for at least another one of the communication channels that belongs to a usage bandwidth interval the same as the operation channel according to the operation class, and adjusts the initial preference score of the at least another one of the communication channels to a second score;

wherein the second score is greater than the first score.

3. The channel selecting method for the wireless communication network of claim 2, wherein the first area information further comprises a plurality of channel utilization rates of the communication channels, and the first adjusting step further comprises:

performing a utilization rate comparing step to configure the main access point to compare a plurality of external channel utilization rates with a channel utilization rate threshold;

wherein in response to determining that one of the external channel utilization rates is greater than or equal to the channel utilization rate threshold, the main access point determines that one of the communication channels corresponding to the one of the external channel utilization rates is a busy channel, and adjust the initial preference score, the first score or the second score corresponding to the busy channel to a third score;

wherein the third score is less than the first score;

wherein the main access point makes a designated channel list according to the communication channels other than the busy channel.

4. The channel selecting method for the wireless communication network of claim 1, wherein the beacon request message comprises a signal strength threshold, the second coverage area covers a second access point, and the second area information obtaining step further comprises:

performing an access point measuring step to configure the main access point to control the communication device through the beacon request message to measure an operation channel, an operation class and a channel power value of the second access point, and convert the channel power value into a signal strength value; and performing a signal strength comparing step to configure the main access point to control the communication device through the beacon request message to compare the signal strength value with the signal strength threshold;

wherein in response to determining that the signal strength value corresponding to the second access point is greater than or equal to the signal strength threshold, the communication device integrates the operation channel, the operation class and the channel power value of the second access point into the second area information.

5. The channel selecting method for the wireless communication network of claim 4, wherein the second adjusting step further comprises:

performing a score assigning step to configure the main access point to assign a first score to one of the communication channels corresponding to the operation channel, search for at least another one of the communication channels that belongs to a usage bandwidth interval the same as the operation channel according to the operation class, and assign a second score to the at least another one of the communication channels, wherein the second score is greater than the first score;

wherein in response to determining that the first score is less than the first preference score, the main access point adjusts the first preference score of the one of the communication channels corresponding to the operation channel to the first score;

wherein in response to determining that the first score is greater than the first preference score, the main access point maintains the first preference score of the one of the communication channels corresponding to the operation channel;

wherein in response to determining that the second score is less than the first preference score, the main access point adjusts the first preference score corresponding to the at least another one of the communication channels to the second score;

wherein in response to determining that the second score is greater than the first preference score, the main access point maintains the first preference score corresponding to the at least another one of the communication channels.

6. The channel selecting method for the wireless communication network of claim 5, wherein the beacon request message further comprises a designated channel list and a channel utilization rate threshold, and the second area information obtaining step further comprises:

performing a channel measuring step to configure the main access point to control the communication device through the beacon request message to measure a plurality of channel utilization rates of a part of the communication channels according to the designated channel list; and performing a utilization rate comparing step to configure the main access point to control the communication device through the beacon request message to compare the channel utilization rates with the channel utilization rate threshold;

wherein in response to determine that one of the channel utilization rates is greater than or equal to the channel utilization rate threshold, the communication device determines that one of the communication channels corresponding to the one of the channel utilization rates is a busy channel, and integrates a channel information of the busy channel into the second area information;

wherein in response to determine that the busy channel is different from a main operation channel of the main access point, the main access point adjusts the first preference score corresponding to the busy channel to a third score, and the third score is less than the first score.

7. The channel selecting method for the wireless communication network of claim 6, wherein in response to determining that the busy channel is the main operation channel and a main channel utilization rate of the main operation channel is less than the channel utilization rate threshold, the main access point adjusts the initial preference score corresponding to the main operation channel to the third score.

8. The channel selecting method for the wireless communication network of claim 6, wherein in response to determining that the busy channel is the main operation channel and different from the operation channel of the second access point, and a main channel utilization rate of the main operation channel is greater than or equal to the channel utilization rate threshold, the main access point maintains the initial preference score corresponding to the main operation channel.

9. The channel selecting method for the wireless communication network of claim 6, wherein in response to determining that the busy channel is the main operation channel and the same as the operation channel of the second access point, and a main channel utilization rate of the main operation channel is greater than or equal to the channel utilization rate threshold, the main access point adjusts the initial preference score corresponding to the main operation channel to the third score.

10. The channel selecting method for the wireless communication network of claim 1, wherein the main access point operates on a main operation channel, wherein, in response to determining that the target channel is different from the main operation channel, the main access point sends a channel switch announcement to the communication device, causing the main access point and the communication device to switch from the main operation channel to the target channel; and in response to determining that the target channel is the same as the main operation channel, the main access point maintains utilizing the main operation channel to communicate with the communication device.

11. A channel selecting system for a wireless communication network, comprising:

a main access point providing a first coverage area in the wireless communication network; and a communication device signally connected to the main access point, wherein the communication device is located in the first coverage area and has a second coverage area in the wireless communication network;

wherein the main access point is configured to implement a channel selecting method for the wireless communication network comprising:

performing a first area information obtaining step comprising configuring the main access point to perform a channel scanning on a plurality of communication channels to obtain a first area information corresponding to the first coverage area;

performing a first adjusting step comprising configuring the main access point to assign an initial preference score to each of the communication channels and adjust the initial preference score of each of the communication channels to a first preference score according to the first area information;

performing a beacon request transmitting step comprising configuring the main access point to transmit a beacon request message to the communication device;

performing a second area information obtaining step comprising configuring the main access point to control the communication device through the beacon request message to perform another channel scanning on the communication channels to obtain a second area information corresponding to the second coverage area from the communication device;

performing a second adjusting step comprising configuring the main access point to adjust the first preference score of each of the communication channels to a second preference score according to the second area information;

performing a channel selecting step comprising configuring the main access point to select one of the communication channels corresponding to the second preference score with a maximum value as a target channel and utilize the target channel to communicate with the communication device.

12. The channel selecting system for the wireless communication network of claim 11, further comprising:

a first access point signally connected to the main access point and covered by the first coverage area, wherein the first area information comprises an operation channel, an operation class and a channel power value of the first access point;

wherein the first adjusting step further comprises:

performing a signal strength comparing step to configure the main access point to convert the channel power value into a signal strength value and compare the signal strength value with a signal strength threshold;

wherein in response to determine that the signal strength value corresponding to the first access point is greater than or equal to the signal strength threshold, the main access point adjusts the initial preference score corresponding to the operation channel of one of the communication channels to a first score, searches for at least another one of the communication channels that belongs to a usage bandwidth interval the same as the operation channel according to the operation class, and adjusts the initial preference score of the at least another one of the communication channels to a second score;

wherein the second score is greater than the first score.

13. The channel selecting system for the wireless communication network of claim 12, wherein the first area information further comprises a plurality of channel utilization rates of the communication channels, and the first adjusting step further comprises:

performing a utilization rate comparing step to configure the main access point to compare a plurality of external channel utilization rates with a channel utilization rate threshold;

wherein in response to determining that one of the external channel utilization rates is greater than or equal to the channel utilization rate threshold, the main access point determines that one of the communication channels corresponding to the one of the external channel utilization rates is a busy channel, and adjust the initial preference score, the first score or the second score corresponding to the busy channel to a third score;

wherein the third score is less than the first score;

wherein the main access point makes a designated channel list according to the communication channels other than the busy channel.

14. The channel selecting system for the wireless communication network of claim 11, further comprising:

a second access point signally connected to the communication device and covered by the second coverage area;

wherein the beacon request message comprises a signal strength threshold, and the second area information obtaining step further comprises:

performing an access point measuring step to configure the main access point to control the communication device through the beacon request message to measure an operation channel, an operation class and a channel power value of the second access point, and convert the channel power value into a signal strength value; and performing a signal strength comparing step to configure the main access point to control the communication device through the beacon request message to compare the signal strength value with the signal strength threshold;

wherein in response to determining that the signal strength value corresponding to the second access point is greater than or equal to the signal strength threshold, the communication device integrates the operation channel, the operation class and the channel power value of the second access point into the second area information.

15. The channel selecting system for the wireless communication network of claim 14, wherein the second adjusting step further comprises:

performing a score assigning step to configure the main access point to assign a first score to one of the communication channels corresponding to the operation channel, search for at least another one of the communication channels that belongs to a usage bandwidth interval the same as the operation channel according to the operation class, and assign a second score to the at least another one of the communication channels, wherein the second score is greater than the first score;

wherein in response to determining that the first score is less than the first preference score, the main access point adjusts the first preference score of the one of the communication channels corresponding to the operation channel to the first score;

wherein in response to determining that the first score is greater than the first preference score, the main access point maintains the first preference score of the one of the communication channels corresponding to the operation channel;

wherein in response to determining that the second score is less than the first preference score, the main access point adjusts the first preference score corresponding to the at least another one of the communication channels to the second score;

wherein in response to determining that the second score is greater than the first preference score, the main access point maintains the first preference score corresponding to the at least another one of the communication channels.

16. The channel selecting system for the wireless communication network of claim 15, wherein the beacon request message further comprises a designated channel list and a channel utilization rate threshold, and the second area information obtaining step further comprises:

performing a channel measuring step to configure the main access point to control the communication device through the beacon request message to measure a plurality of channel utilization rates of a part of the communication channels according to the designated channel list; and performing a utilization rate comparing step to configure the main access point to control the communication device through the beacon request message to compare the channel utilization rates with the channel utilization rate threshold;

wherein in response to determining that one of the channel utilization rates is greater than or equal to the channel utilization rate threshold, the communication device determines that one of the communication channels corresponding to the one of the channel utilization rates is a busy channel, and integrates a channel information of the busy channel into the second area information;

wherein in response to determining that the busy channel is different from a main operation channel of the main access point, the main access point adjusts the first preference score corresponding to the busy channel to a third score, and the third score is less than the first score.

17. The channel selecting system for the wireless communication network of claim 16, wherein in response to determining that the busy channel is the main operation channel and a main channel utilization rate of the main operation channel is less than the channel utilization rate threshold, the main access point adjusts the initial preference score corresponding to the main operation channel to the third score.

18. The channel selecting system for the wireless communication network of claim 16, wherein in response to determining that the busy channel is the main operation channel and different from the operation channel of the second access point, and a main channel utilization rate of the main operation channel is greater than or equal to the channel utilization rate threshold, the main access point maintains the initial preference score corresponding to the main operation channel.

19. The channel selecting system for the wireless communication network of claim 16, wherein in response to determine that the busy channel is the main operation channel and the same as the operation channel of the second access point, and a main channel utilization rate of the main operation channel is greater than or equal to the channel utilization rate threshold, the main access point adjusts the initial preference score corresponding to the main operation channel to the third score.

20. The channel selecting system for the wireless communication network of claim 11, wherein the main access point operates on a main operation channel, wherein, in response to determining that the target channel is different from the main operation channel, the main access point sends a channel switch announcement to the communication device, causing the main access point and the communication device to switch from the main operation channel to the target channel; and in response to determining that the target channel is the same as the main operation channel, the main access point maintains utilizing the main operation channel to communicate with the communication device.

* * * * *